Patented Oct. 16, 1934

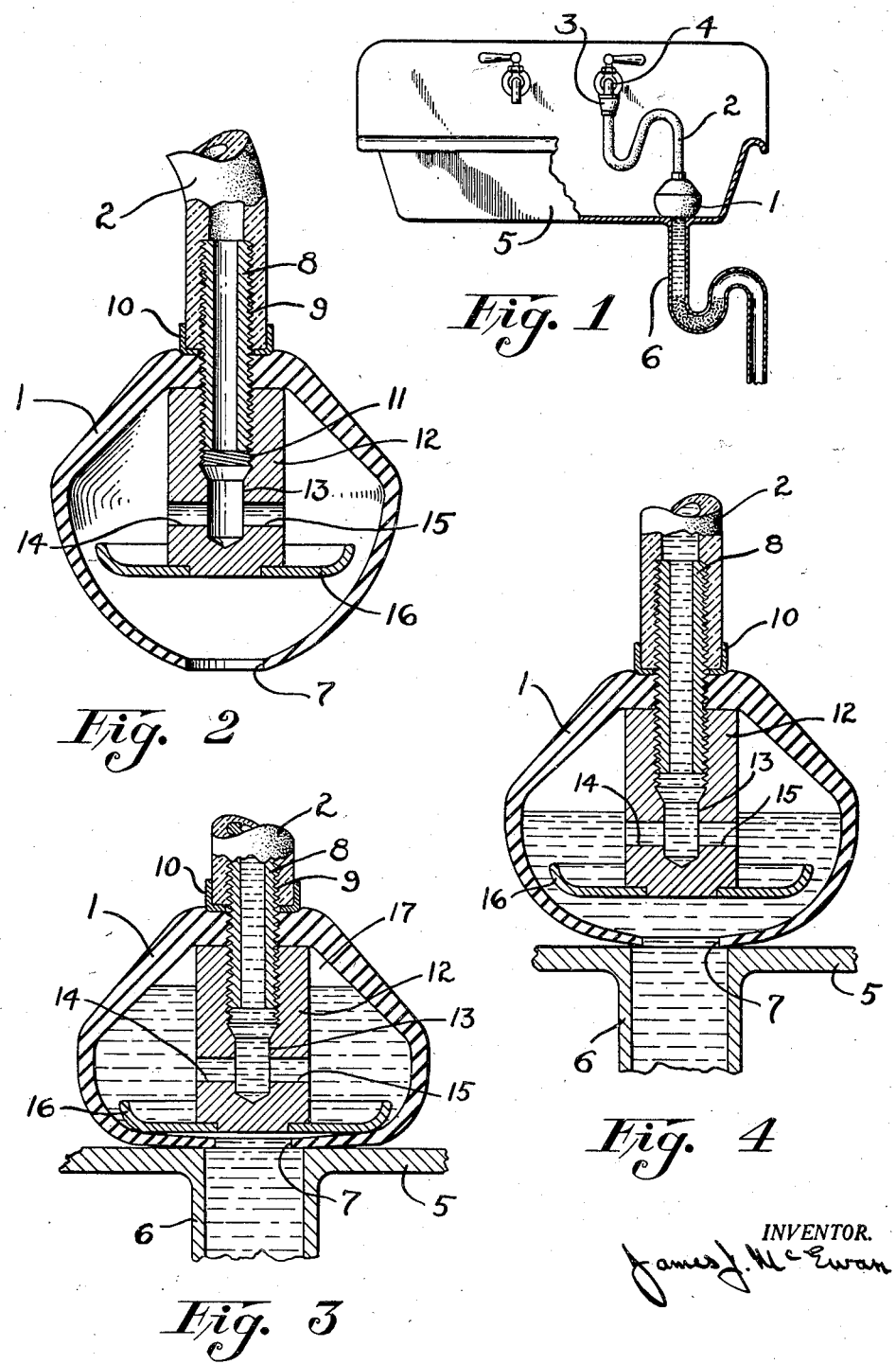

1,977,319

UNITED STATES PATENT OFFICE 1,977,319

DRAIN FLUSHING DEVICE

James J. McEwan, Pontiac, Mich.

Application April 18, 1933, Serial No. 666,693

5 Claims. (Cl. 4—256)

My invention relates to means for flushing drains, and in particular it relates to a connection adapted for contact engagement with a drain opening. In general it consists of a substantially spherical flexible member forming a chamber communicating with a source of fluid pressure supply, a relatively small aperture adapted for association with a drain, means disposed within the chamber capable of dividing same into substantially an upper and a lower compartment and communicating apertures joining said upper compartment with a source of fluid pressure supply.

An object of my invention is to provide means for flushing drains and the like by utilizing conventional source of fluid pressure and concentrating same on said drain or the like.

A further object of my invention consists of an effective means for flushing drains by the creation of a pulsating action produced by means of fluid pressure co-acting with the device herein set forth. Other objects are ease of manipulating the device, quickness in flushing and clearing the drain, simplicity of construction and durability of the article itself.

Reference may be had to the accompanying drawing wherein a more complete understanding of the invention may be obtained when considered in connection with the following detailed description.

In the drawing:

Figure 1, is a side elevation partly in section of a conventional form of sink illustrating the herein described flushing device in one form of application.

Figure 2, is a side elevational view in section of the drain adaptor end of the flushing device.

Figures 3 and 4, are similar views of the adaptor shown in operative contact engagement with a drain.

In Figure 1, the numeral 1 represents an outer shell of the drain contacting adaptor; 2 represents a flexible tube or conduit connecting the adaptor 1 with a faucet engaging means 3. This faucet engaging means 3 may be of any conventional connection, such as is ordinarily used to join a flexible hose with a conventional faucet 4. By way of illustration of the practical application of my invention, I show a conventional sink 5 having a trap drain 6 connected thereto.

As shown in Figure 2, the adaptor shell 1 consists of a hollow member having a substantially spherical form and composed of resilient material, such as rubber. At the lowermost portion of said adaptor, an aperture 7 forms an opening between the interior and exterior walls thereof. This aperture 7 is relatively small in comparison with the size of the spherical adaptor 1. Such aperture 7 need be large enough only so that it will permit with ease the natural flow of fluid pressure as supplied through the flexible hose 2.

At the upper end of the adaptor 1, and axially opposed to the aperture 7, I provide a rigid and leak-proof connection between the adaptor 1 and the hose 2. This connection consists of a threaded tubular member 8 having external threads 9 adapted for threaded engagement with the flexible hose 2. A retaining ferrule or collar 10 forms an inextensible member for confining the end of the flexible hose 2. The tubular joining member 8 extends from the hose 2 and into the interior of the adaptor 1 wherein it co-operates with internal threads 11 forming a part of a cylindrical extension 12 which acts as a nut for holding the adaptor 1 in rigid engagement with the hose 2.

The extension 12 has a central aperture 13 communicating with the aperture of the tubular member 8. Transverse apertures 14 and 15 join the axial aperture 13 and form communications from the apertures 13 through the sides of the extension 12.

At the lower end of the extension 12, I provide a disc or flange 16 rigidly attached, as by riveting to the extension 12, and having a marginal outline of such dimensions so as to extend closely to the inner wall of the adaptor shell 1. Said flange 16 has its outer marginal portions upturned cup-shape-like, so that upon depressing the adaptor 1 in a downward movement a better contacting effect will take place between the outer surface portions of the disc 16 and the inner wall of the adaptor 1. As an example of the position of the said flange 16, I find that good practical results may be obtained by maintaining a space of about one-eighth of an inch from the flange 16 to the inner wall of the adaptor shell 1. Also, good results are obtained when the flange 16 is located at such vertical position relative to the adaptor 1 so that when the adaptor is firmly held against a conventional drain the depression by flexing of the lowermost portion of the adaptor 1 will cause the outer surface of the flange 16 to contact with the inner wall of the adaptor shell 1.

In order that the novelty and functional operation will be better understood, reference may be had to Figures 3 and 4. In Figure 3, I show the adaptor in operative position with the conventional sink 5 and drain 6. It is to be understood that the device herein described is to be held in contact with the drain manually. In other words, the operator grasps the device by hand at the flexible hose and/or the adaptor, and exerts such downward pressure on same so as to partially flatten out the lowermost portion of the spherical adaptor 1. As this is accomplished it is noted, as shown in Figure 3, that the flange 16 contacts with the inner wall of the adaptor and makes a seal therewith so that when the operator turns on the faucet to permit fluid pressure to pass through the device, the fluid is emitted from the apertures 14 and 15 and into the spherical adaptor 1. The flange 16 in its contact relation with the inner walls of the adaptor 1 functionally operates as a conventional valve.

As the water continues to flow into the adaptor 1, pressure begins to build up therein, thus displacing the atmospheric pressure which was previously present within the adaptor, and, as there is no escape for said atmospheric pressure, same is compressed into the upper part of the adaptor designated in Figure 3 as chamber 17. As fluid pressure further builds up within the adaptor there is a natural tendency for the adaptor to blow circular. To assume such a position the fluid pressure reacts to elevate the adaptor and mechanism contained therein relative to the sink and drain. When this occurs the flange 16 is also elevated in relation to the lower portion of the spherical adaptor thereby breaking the seal between the outer marginal portions of the flange 16 and the inner walls of the adaptor 1. Immediately upon the breaking of such seal, the fluid pressure, water, assisted by the compressed atmosphere confined in the chamber designated 17, expands quickly and with much force causing the water contained within the adaptor to flow out through the aperture 7 and onto the drain.

The adaptor and mechanism contained therein then assumes the position as shown in Figure 4. This view shows the adaptor in elevated position relative to the drain, and the water partially forced out from within the adaptor to a point where the lowermost portion of the rubber spherical adaptor is about ready to lower into the position shown in Figure 3 by reason of the manual pressure which normally retains the adaptor against the sink drain. For it is to be understood that during the entire time when the flushing device is held in contact engagement with the sink drain, the operator, who is holding same in position, applies a substantially uniform and constant pressure on the adaptor against the sink drain without attempting to manually produce any vertical pulsating operation of the device.

The vertical pulsating movement in this case is produced entirely automatic by reason of the vertical reciprocating motion of the flange 16 against the inner walls of the adaptor 1 which operates as a valve and causes an intermittent sealing and release action in quick successive operations. This pulsating condition is of considerable importance in unclogging drains as it sets up a vibrating ram-like force throughout the drain line, thus combining a jarring action with a pressure action concentrated against whatever obstruction may be within the drain line.

I am aware that a conventional form of plumber's tool may be operated manually to produce a pulsating motion to remove obstruction in drain lines. However, with my device I provide a quick automatic hammer like pulsating action assisted by intermittent fluid pressure which has conclusively demonstrated itself to be far superior to the above referred to conventional form of flushing device, with the result that my invention is capable of unclogging drains quickly and with but slight effort on the operator's part. Furthermore, the herein disclosed invention is capable of unclogging drains which ordinary flushing devices have failed to clear.

While I have shown one form of my invention it is to be understood that I do not limit myself to the specific embodiment as herein disclosed except as restricted by the scope of the appending claims.

Having thus described my invention what I claim is:

1. In a drain cleaner, the combination of a flexible hose adapted for engagement at one end with a faucet nozzle, a resilient hollow ball-shaped adaptor, having an outlet aperture, attached to the opposite end, and a disc disposed within said adaptor, the edges of said disc being normally free from contact engagement with said adaptor, whereby, when said drain cleaner is held in operable position, said disc operates to restrict said outlet aperture.

2. In a drain cleaner, the combination of a flexible hose adapted for engagement at one end with a faucet nozzle, a resilient hollow ball-shaped adaptor, having an outlet aperture, attached to the opposite end, and a disc disposed within said adaptor, the edges of said disc being normally free from contact engagement with said adaptor, whereby, when said drain cleaner is held in operative position, said disc operates to restrict said outlet aperture by contacting with the inner walls of said adaptor.

3. In a drain cleaner, the combination of a flexible hose adapted for engagement at one end with a faucet nozzle, a resilient hollow ball-shaped adaptor, having an outlet aperture, attached to the opposite end, and an extension member axially disposed within said adaptor and supporting a disc having upturned marginal portions located in close proximity to the inner walls of said adaptor.

4. In a drain cleaner, the combination of a flexible hose adapted for engagement at one end with a faucet nozzle, a resilient hollow ball-shaped adaptor, having an outlet aperture, attached to the opposite end, and an extension member axially disposed within said adaptor and supporting a disc having upturned marginal portions located in close proximity to the inner walls of said adaptor, said extension member having a central aperture communicating with said flexible hose and having lateral apertures joining said central aperture with the interior of said adaptor.

5. In a drain cleaner, the combination of a flexible hose adapted for engagement at one end with a faucet nozzle, a resilient hollow ball-shaped adaptor, having an outlet aperture, attached to the opposite end, and an extension member axially disposed within said adaptor and supporting a disc having upturned marginal portions located in close proximity to the inner walls of said adaptor, said disc being located substantially midway between the center and the lowermost portion of said adaptor.

JAMES J. McEWAN.